United States Patent [19]
DiRisio

[11] Patent Number: 6,070,014
[45] Date of Patent: May 30, 2000

[54] ANTI-BACKUP PAWL FOR MANUAL FILM WINDER REINFORCED WHEN FILM WINDER REVERSE ROTATED

[75] Inventor: Anthony DiRisio, Rochester, N.Y.

[73] Assignee: Eastman Kodak Company, Rochester, N.Y.

[21] Appl. No.: 09/283,416

[22] Filed: Apr. 1, 1999

[51] Int. Cl.$^7$ .................................................. G03B 17/24
[52] U.S. Cl. ............................................. 396/6; 396/396
[58] Field of Search ........................................ 396/6, 396

[56] References Cited

U.S. PATENT DOCUMENTS

| 5,752,086 | 5/1998 | Negishi et al. . | |
| 5,956,526 | 9/1999 | DiRisio | 396/6 |

FOREIGN PATENT DOCUMENTS

| 5-273636 | 10/1993 | Japan . |
| 6-82976 | 3/1994 | Japan . |
| 7-114147 | 5/1995 | Japan . |
| 8-201987 | 8/1996 | Japan . |
| 9-106047 | 4/1997 | Japan . |
| 9-236891 | 9/1997 | Japan . |

*Primary Examiner*—David M. Gray
*Attorney, Agent, or Firm*—Roger A. Fields

[57] ABSTRACT

A camera comprising a rotatably supported film winding wheel that has a series of teeth and is manually rotated in a film winding direction, and an anti-backup pawl that is resiliently supported for successive ones of the teeth to deflect the anti-backup pawl out of engagement with the respective teeth when the film winding wheel is manually rotated in the film winding direction and that continuously engages any one of the teeth to substantially prevent rotation of the film winding wheel in a reverse direction when it is attempted to manually rotate the film winding wheel in the reverse direction, is characterized in that the anti-backup pawl is connected with a catch and is resiliently supported for any one tooth that is engaging the anti-back up pawl to push the anti-backup pawl when it is attempted to manually rotate the film winding wheel in the reverse direction, and a fixed reinforcing stop is spaced from the catch to allow the anti-backup pawl to be deflected out of engagement with the respective teeth when the film winding wheel is manually rotated in the film winding direction and which is positioned to engage the catch to prevent the anti-backup pawl from being pushed when it is attempted to manually rotate the film winding wheel in the reverse direction.

2 Claims, 3 Drawing Sheets

ANTI-BACKUP PAWL FOR MANUAL FILM WINDER REINFORCED WHEN FILM WINDER REVERSE ROTATED

CROSS-REFERENCE TO RELATED APPLICATIONS

Reference is made to commonly assigned, co-pending applications Ser. No. 09/283,420, entitled CAMERA WITH FRAME SHIFT PREVENTION DURING EXPOSURE and filed Apr. 1, 1999 in the name of Anthony DiRisio, and Ser. No. 09/283,420, entitled FRAME COUNTER DISPLACEABLE TO PERMIT RETURN OF COUNTER ACTUATOR and filed Apr. 1, 1999 in the name of Anthony DiRisio.

The cross-referenced applications are incorporated into this application.

FIELD OF THE INVENTION

The invention relates generally to the field of photography, and in particular to cameras. More specifically, the invention relates to an anti-backup pawl for a manual film winder that is reinforced to prevent the anti-backup pawl from being broken when the film winder is attempted to be reverse rotated.

BACKGROUND OF THE INVENTION

Film and cameras that are all in one, commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound from the film cartridge onto a film take-up spool in a film supply chamber, a backframe opening between the cartridge receiving and film supply chambers for exposing successive frames of the filmstrip, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a counter wheel rotatable to indicate the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge and moves a fresh frame of the filmstrip from the unexposed film roll to the backframe opening. The rewinding movement of the filmstrip the equivalent of slightly more than one frame width rotates the metering sprocket in engagement with the filmstrip to decrement the counter wheel to its next lower-numbered frame setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

The Prior Art Problem

Typically, the film winding thumbwheel has a peripheral series of teeth, and an anti-backup pawl is adapted to engage any one of the teeth to prevent rotation of the thumbwheel in a reverse direction, i.e. opposite to the film winding direction. The anti-backup pawl is resiliently supported for successive ones of the teeth to deflect the pawl out of engagement with the respective teeth when the thumbwheel is manually rotated in the film winding direction. Conversely, when one attempts to manually rotate the thumbwheel in the reverse direction, the anti-backup pawl continuously engages any one of the teeth to substantially prevent rotation of the thumbwheel in the reverse direction. Attempting to rotate the thumbwheel in the reverse direction, however, can result in breaking the anti-backup pawl.

SUMMARY OF THE INVENTION

A camera comprising a rotatably supported film winding wheel that has a series of teeth and is manually rotated in a film winding direction, and an anti-backup pawl that is resiliently supported for successive ones of the teeth to deflect the anti-backup pawl out of engagement with the respective teeth when the film winding wheel is manually rotated in the film winding direction and that continuously engages any one of the teeth to substantially prevent rotation of the film winding wheel in a reverse direction when it is attempted to manually rotate the film winding wheel in the reverse direction, is characterized in that:

the anti-backup pawl is connected with a catch and is resiliently supported for any one tooth that is engaging the anti-back up pawl to push the anti-backup pawl when it is attempted to manually rotate the film winding wheel in the reverse direction; and a fixed reinforcing stop is spaced from the catch to allow the anti-backup pawl to be deflected out of engagement with the respective teeth when the film winding wheel is manually rotated in the film winding direction and which is positioned to engage the catch to prevent the anti-backup pawl from being pushed when it is attempted to manually rotate the film winding wheel in the reverse direction.

DETAILED DESCRIPTION OF THE INVENTION

Figure 1:
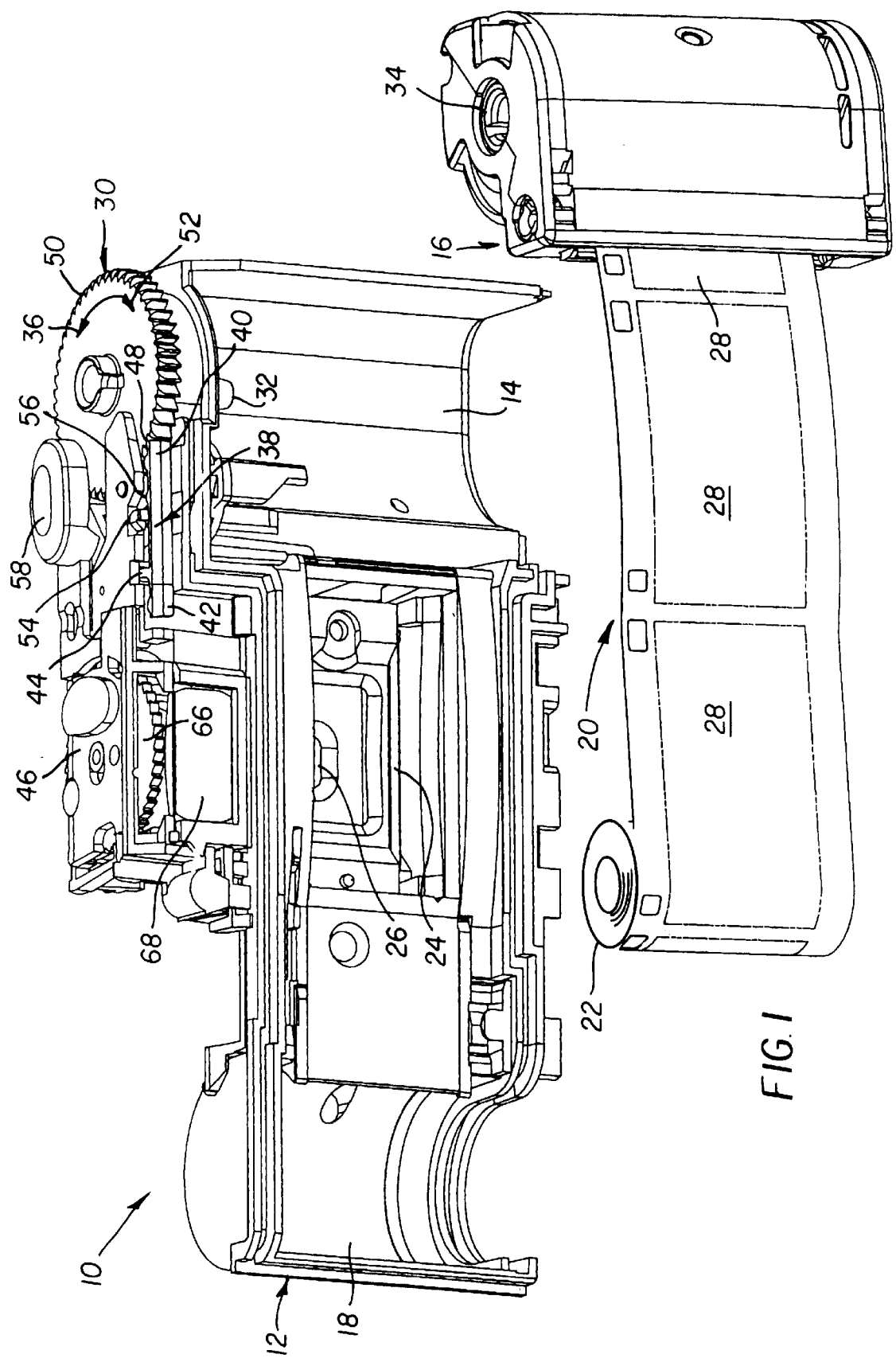
FIG. 1 is a rear, partially exploded, perspective view of a portion of a one-time-use camera according to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIG. I partially shows a one-time-use camera 10 that includes an opaque plastic main body part 12. The main body part 12 has a rearwardly-open film take-up chamber 14 that contains a conventional film cartridge 16, a rearwardly-open film supply chamber 18 that contains an unexposed filmstrip 20 which is prewound during camera manufacture from the film cartridge into an unexposed film roll 22 in the film supply chamber, and a rearwardly-open exposure opening 24 that is behind a front aperture 26 in the main body part. Ambient light passes through the front aperture 26 to the exposure opening 24 in order to expose successive frames 28 of the filmstrip 20. A pair of opaque plastic front and rear cover parts (not shown) house the main body part 12 between them.

A film winding thumbwheel 30 is rotatably supported on the main body part 12 and has a depending coaxial stem 32 that longitudinally extends through a top hole, not shown, in the main body part to be rotatably engaged with an exposed end 34 of a film spool inside the film cartridge 16 in the film take-up chamber 14. The film winding thumbwheel 30 is manually rotated in a film winding direction 36, i.e. counter-clockwise in FIGS. 1 and 2, to wind each frame 28 of the filmstrip 20 that is exposed at the exposure opening 24 into the film cartridge 16 and to advance a fresh frame of the filmstrip from the unexposed film roll 22 to the exposure opening.

A beam 38 has opposite free ends 40 and 42 and a resilient flexible (elastic) support 44 between the free ends that integrally connects the beam with a top piece 46 on the main body part 12.

Figure 2:
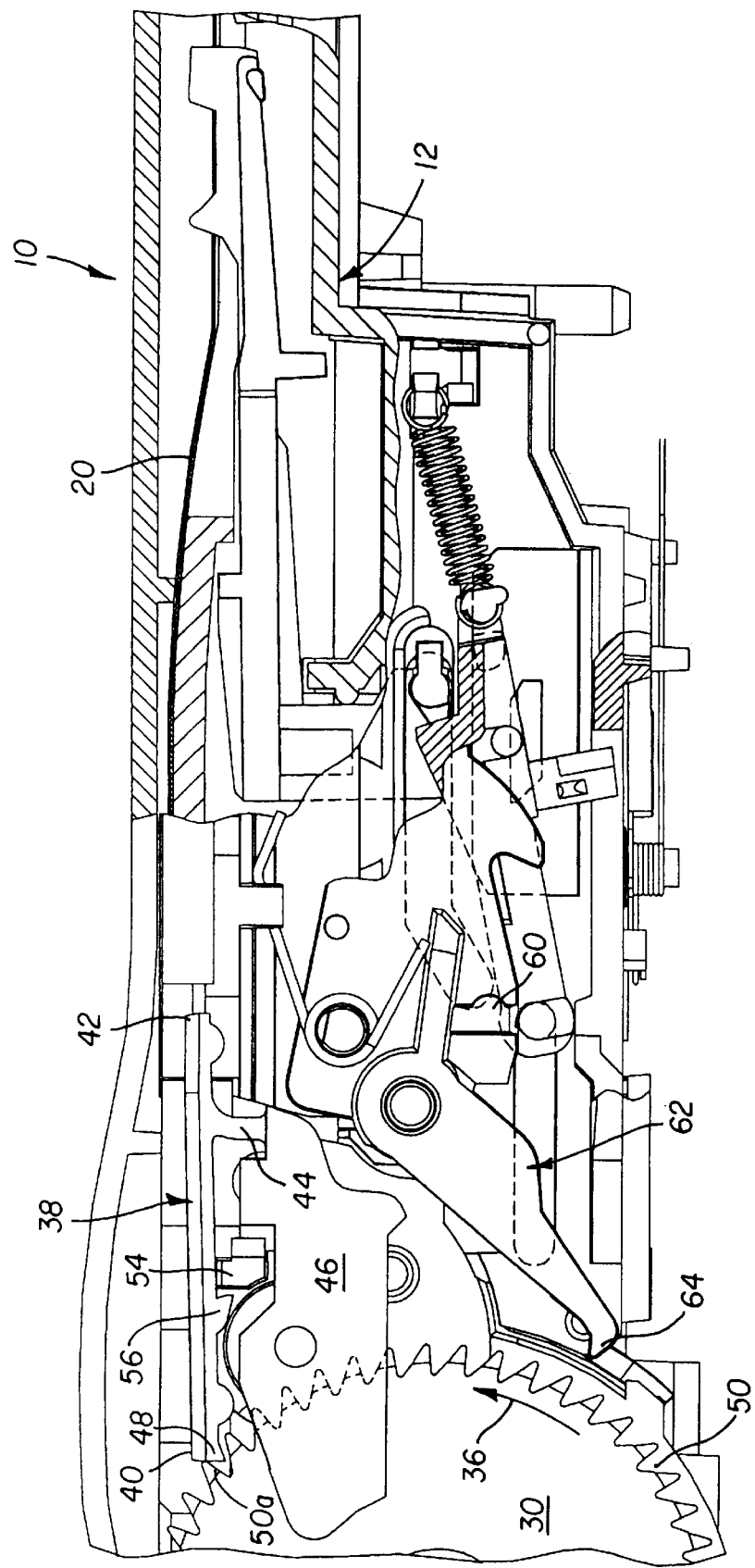
FIG. 2 is a top plan view of the one-time-use camera with several parts removed to show a film winding thumbwheel and an anti-backup pawl.
Figure 3:
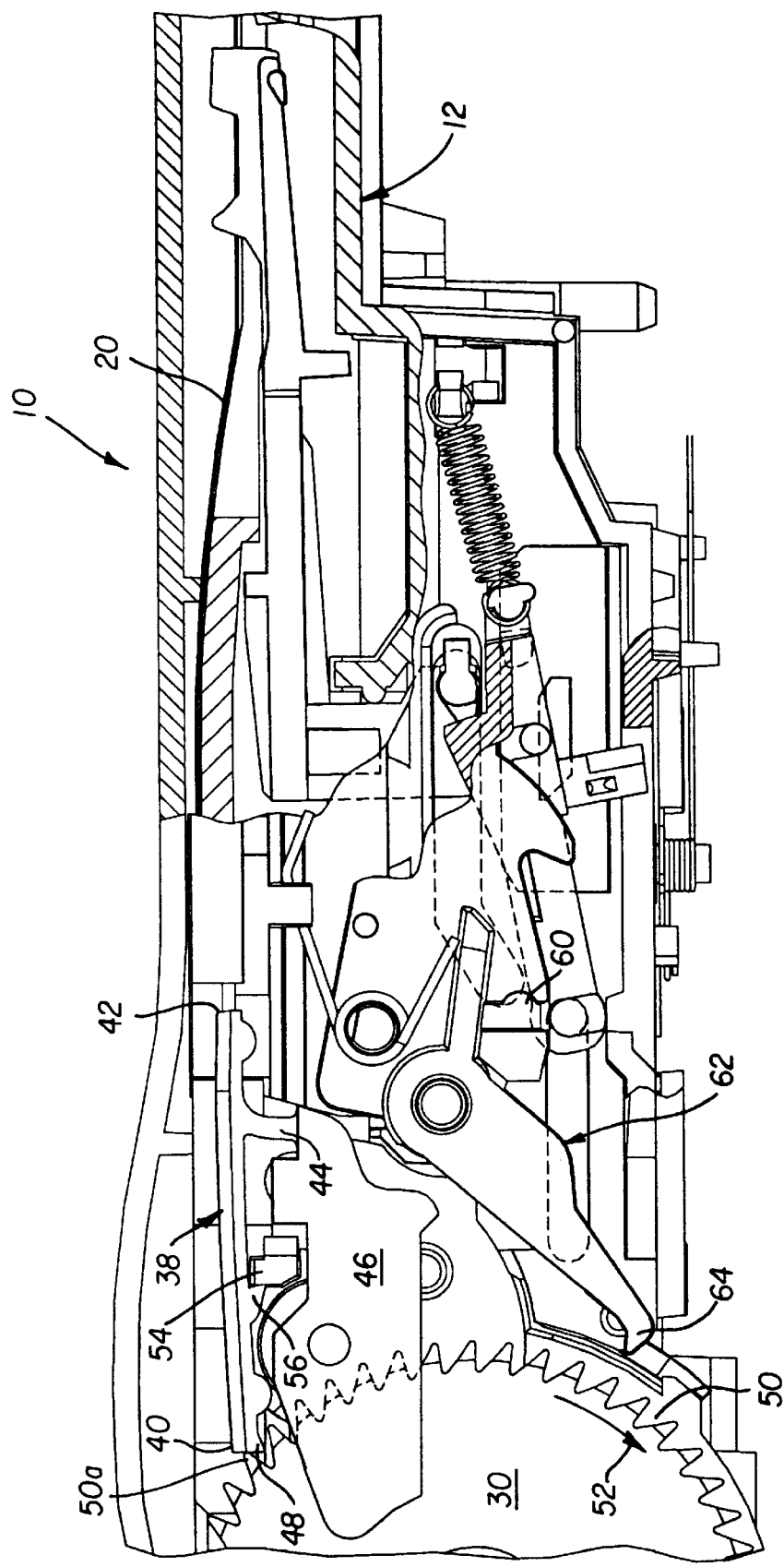
FIG. 3 is a top plan view similar to FIG. 2, showing operation of the anti-backup pawl when one attempts to rotate the thumbwheel in a reverse direction, i.e. opposite to a film winding direction.

An integral anti-backup pawl 48 at the free end 40 of the beam 38 is urged via the resilient flexible support 44 to engage any one of a continuous series of peripheral teeth 50 on the film winding thumbwheel 30, to prevent rotation of the thumbwheel in a reverse direction 52, i.e. opposite to the film winding direction 36. See FIG. 2. The resilient flexible support 44 for the beam 38 allows successive ones of the peripheral teeth 50 to momentarily deflect the anti-backup pawl 48 out of engagement with the respective teeth when the thumbwheel 30 is manually rotated in the film winding direction 36. Conversely, when one attempts to manually rotate the thumbwheel 30 in the reverse direction 52, the anti-backup pawl 40 continuously engages any one of the peripheral teeth 50 to substantially prevent rotation of the thumbwheel in the reverse direction. In this instance, the resilient flexible support 44 allows the one tooth 50*a* in engagement with the anti-backup pawl 48 to tend to push the beam 38 slightly to the right in FIG. 3. A fixed reinforcing stop 54 on the top piece 46 is positioned in the way of an integral catch 56 on the beam 38 to prevent the beam from being pushed to the right in FIG. 3 sufficiently to allow the one tooth 50*a* to disengage from the anti-backup pawl 48. The fixed reinforcing stop 54 is normally spaced from the catch 56, as shown in FIG. 2, to allow the anti-backup pawl 48 to be momentarily deflected out of engagement with the respective teeth 50 when the thumbwheel 30 is manually rotated in the film winding direction 36.

A shutter release button 58 on the top piece 46 is resiliently cantilevered to permit it to be manually depressed to take a picture. The shutter release button 58 has a depending projection, not show, that is swung against an upstanding projection 60 on a locking lever 62, when the shutter release button is manually depressed. This pivots the locking lever 62 counter-clockwise in FIG. 2 for a locking pawl 64 to disengage from any one of the peripheral teeth 50 on the film winding thumbwheel 30, to permit the thumbwheel to be manually rotated in the film winding direction 36.

A frame counter 66 for indicating the number of exposures remaining to be made on the filmstrip 20 is supported for rotation on the top piece 46. See FIG. 1. A direct see-through viewfinder 68 for viewing the subject to be photographed is positioned on the top piece 46, beneath the frame counter 66.

Further details of the one-time-use camera 10 are disclosed in the cross-referenced applications Ser. No. 09/283,420, entitled CAMERA WITH FRAME SHIFT PREVENTION DURING EXPOSURE and, and Ser. No. 09/283,420, entitled FRAME COUNTER DISPLACEABLE TO PERMIT RETURN OF COUNTER ACTUATOR, which are incorporated into this application.

The invention has been described with reference to a preferred embodiment. However, it will be appreciated that variations and modifications can be effected by a person of ordinary skill in the art without departing from the scope of the invention.

PARTS LIST

- 10. one-time-use camera
- 12. main body part
- 14. film take-up chamber
- 16. film cartridge
- 18. film supply chamber
- 20. filmstrip
- 22. unexposed film roll
- 24. exposure opening
- 26. front aperture
- 28. film frames
- 30. film winding thumbwheel
- 32. depending coaxial stem
- 34. exposed spool end
- 36. film winding direction
- 38. beam
- 40. free end
- 42. free end
- 44. resilient flexible (elastic) support
- 46. top piece
- 48. anti-backup pawl
- 50. peripheral teeth
- 50*a*. one tooth
- 52. reverse direction
- 54. fixed reinforcing stop
- 56. catch
- 58. shutter release button
- 60. lever projection
- 62. locking lever
- 64. locking pawl
- 66. frame counter
- 68. viewfinder

What is claimed is:

1. A camera comprising a rotatably supported film winding wheel that has a series of teeth and is manually rotated in a film winding direction., and an anti-backup pawl that is resiliently supported for successive ones of said teeth to deflect said anti-backup pawl out of engagement with the respective teeth when said film winding wheel is manually rotated in the film winding direction and that continuously engages any one of said teeth to substantially prevent rotation of said film winding wheel in a reverse direction when it is attempted to manually rotate said film winding wheel in the reverse direction, is characterized in that:

said anti-backup pawl is connected with a catch and is resiliently supported for any one tooth that is engaging said anti-back up pawl to push said anti-backup pawl when it is attempted to manually rotate said film winding wheel in the reverse direction; and a fixed reinforcing stop is spaced from said catch to allow said anti-backup pawl to be deflected out of engagement with said respective teeth when said film winding wheel is manually rotated in the film winding direction and which is positioned to engage said catch to prevent said anti-backup pawl from being pushed when it is attempted to manually rotate said film winding wheel in the reverse direction.

2. A camera as recited in claim 1, wherein a beam has opposite free ends, said anti-backup pawl is located at one of said free ends, a resilient flexible support is connected with said beam between said free ends to resiliently support said anti-backup pawl, and said catch is located between said anti-backup pawl and said resilient flexible support.

* * * * *